United States Patent Office 2,984,125
Patented May 16, 1961

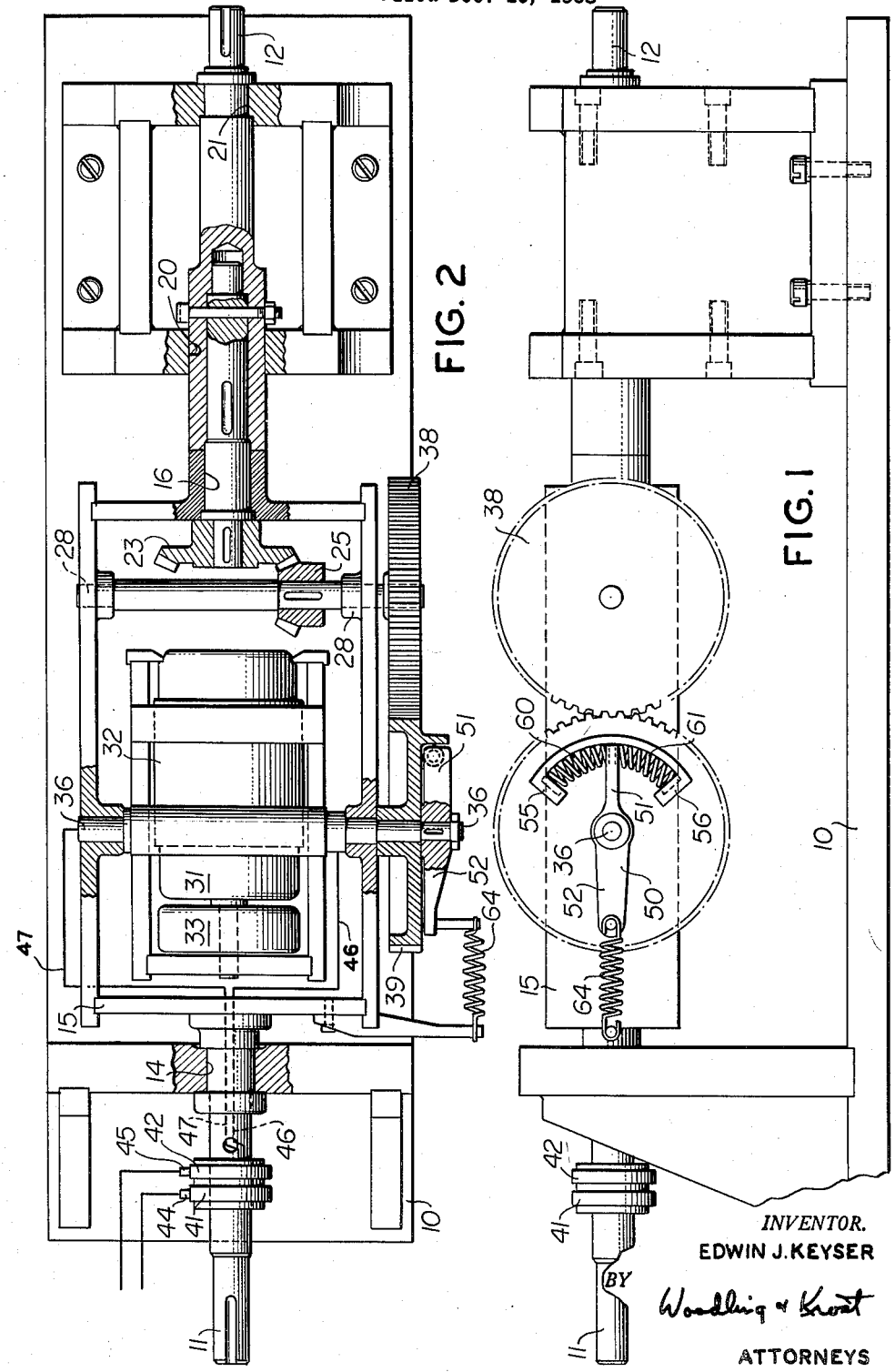
INVENTOR.
EDWIN J. KEYSER
BY Woodling & Krost
ATTORNEYS

1

2,984,125
INERTIA MASS ROTATING TRANSMISSION
Edwin J. Keyser, 6 Valley Drive, Billings, Mont.
Filed Dec. 15, 1958, Ser. No. 780,275
1 Claim. (Cl. 74—751)

The invention relates in general to inertia mass transmissions and more particularly to transmissions wherein the inertia mass is utilized in combination with mass rotation means to transmit torque from a drive or input shaft to a driven or output shaft.

An object of the invention is to provide a transmission which has an infinitely variable speed ratio.

Another object of the invention is to provide an automatically controlled transmission.

Another object of the invention is to provide a manually controlled transmission.

Another object of the invention is to provide a transmission which has means to vary the speed output thereof.

Another object of the invention is to provide a transmission which has means to vary the torque output thereof.

Another object of the invention is to provide a transmission for controlling the relative speed between the input shaft and the output shaft.

Another object of the invention is to provide a transmission for controlling the relative torque between the input shaft and the output shaft.

Another object of the invention is to provide a transmission which utilizes an inertia mass which is rotatably mounted for movement about an axis generally transverse to the main axis of the transmission with a means for altering the normal pattern of movement of the inertia mass, within each cycle, which results from a given set of conditions.

Another object of the invention is to provide an inertia mass transmission which utilizes an inertia mass carried by an input shaft and rotatably mounted thereon for movement about an axis generally transverse to the input shaft and which also utilizes gear or other means to interconnect the output shaft of the transmission to the inertia mass member for affecting the rotation of the inertia mass on its pivotal mounting.

Other objects and a fuller understanding of this invention may be had by referring to the following description and claims, taken in conjunction with the accompanying drawings, in which:

Figure 1 is a side elevational view of a transmission constructed under the teachings of the present invention and utilizing a gyroscope as a three-dimensional inertia mass which is a revolving and rotating inertia mass whose effective forces can be resolved to three dimensions as opposed to a two dimensional inertia mass which is a rotating, but not a revolving inertia mass, whose effective forces can be resolved to two dimensions;

Figure 2 is a plan view of the device shown in Figure 1.

The transmission illustrated in Figures 1 and 2 includes generally a mounting 10 and input and output shafts 11 and 12, respectively. The input shaft is journalled in a bearing 14 and secured to the input shaft is a carrier 15 which has one end thereof secured to the input shaft and which has the other end journalled on a bearing 16 on the output shaft. The output shaft 12 is mounted on bearings 20 and 21 and secured to the end thereof is a primary or bevel gear 23 which may also be referred to as a sun gear. Another bevel gear 25 which may be called a planet or secondary gear, is journalled by the carrier 15 as at 28 and this planet gear intermeshes with the sun gear 23. A gyroscope 31 which includes a motor 32 and a revolvable mass 33 is mounted on the carrier by a shaft or pivot means 36. The shaft 36 mounts the gyroscope so it will rotate on an axis generally transverse to the input shaft. Gear means are provided for transmitting movements from the planet gear 25 to the shaft 36 and vice versa. The gear means include a gear 38 associated with the shaft which mounts the planet gear 25 and this gear intermeshes with a gear 39 which is mounted on the shaft 36. It will be specifically noted that in the detailed structure herein disclosed that the gear 39 is mounted on the shaft 36 for independent rotation with respect thereto. Assuming, however, that the gear 39 is fixedly mounted on the shaft 36 for rotation therewith, it will be seen that upon a given rotation of the input shaft 11 and under a given condition of the output, for example, assuming that it is held fixed, the axis of revolution of the gyroscopic mass or any point thereon will describe a normal and in this specific instance a symmetrical pattern during one cycle of operation. A cycle of the gyroscope 31 in Figures 1 and 2 is a rotation of the same on the shaft 36 of 360 degrees. This is referred to as the normal path of the axis of revolution of the gyroscope and it will be noted in the claims that this is said to be caused by the rotation of the carrier and the connection of the pivot means to the sun gear by the gear means. It should be readily appreciated by those skilled in the art that the use of the term gear means encompasses any other equivalent means, for example, the utilization of V-belts or any other type of power train.

Means are provided for supplying power to the gyroscope motor 32 for independently revolving the mass 33 about the gyroscope axis. This means includes first and second collector rings 41 and 42 respectively, which are engaged by first and second brushes 44 and 45. Electrically connected to each of the collector rings are conductors 46 and 47 respectively, which extend as seen in Figure 2 to the shaft 36 which rotatively mounts the gyroscope 31. The shaft is utilized as an electric conductor to supply the power to the motor 32. It should be readily appreciated by those skilled in the art that any means might be utilized to supply power for driving the gyroscope motor which in turn drives the mass 33 and the instant embodiment is only one of these many means.

A means is provided for changing what has been referred to above as the normal path of the axis of revolution of the gyroscope. This means which has been utilized resides in the fact that the gear 39 which is mounted on the shaft 36 is not fixedly secured thereto but is mounted whereby there may be relative rotational movement between the gear 39 and the shaft 36. Fixedly secured to the shaft 36 for rotation therewith is an arm 50. This arm 50 is provided with first and second end portions 51 and 52, respectively. First and second abutment members or lugs 55 and 56 respectively, are fixedly mounted by the gear 39 and are located on either side of the first end portion 51 of the arm 50. First and second springs 60 and 61 extend between the first end portion of the arm and the first and second abutments or lugs 55 and 56, respectively. Spring means 64 are utilized and one end of the spring means 64 is secured to the second end portion 52 of the arm 50 and the other end extends to and is fastened to the carrier 15. Movement is therefore transmitted between the shaft 36 and the gear 39 by way of the abutments 55 and 56, springs 60 and 61 and the arm 50. This in combination with the use of the spring 64 serves to alter the otherwise normal path of the axis of revolution of the gyroscope which is caused by the input rotation, the conditions on the output, and the rotation of the gyroscope mass. It will thus be seen that during one-half the cycle of movement of the gyroscope axis that the movement will be slow in the sense of the gyroscope rotating with the shaft 36 whereas the second-half of the cycle will be comparatively much faster.

The utilization of the means for altering the otherwise symmetrical path of the gyroscope or three dimension inertia mass axis is to redirect the inertia forces of the inertia mass. The reasons that the inertia forces are desirably redirected is so that the transmission will not lock too strongly into a one-to-one gear ratio or high gear. This is also utilized so that a smoother transmission of power from the input to the output shaft will result. This also increases the capacity of the transmission. Another reason for utilizing the means which have been disclosed is so that in the event it is desirable to use more than one inertia mass this can be done, otherwise when one of the inertia masses is set to supplement the other they cancel each other out. It should readily be appreciated also that the otherwise normal path of the gyroscope axis may be altered by means other than that utilized in the detailed drawings. This path may be altered by the use of eccentric gears, other mechanical means or by pneumatic, hydraulic, or electric means rather than by the utilization of springs which have been disclosed herein. It should also be appreciated that the means for changing this above referred to path may also be interposed in the input shaft rather than interposing the means between the output shaft and the pivot means for rotating the gyroscope.

By the means utilized, what has effectively been done is to vary the speed of rotation of the mass as it goes through its cycle by going through one-half of the cycle at a higher speed than the remaining half of the cycle. By controlling the rotational speed of the two portions of the cycle, the direction of the force exerted by the inertia mass can be controlled. This inertia force of the inertia mass may also be controlled by increasing the speed of the input while the mass goes through one-half of its cycle and reducing the speed of the input during the other half of its cycle.

*Operation*

In operation let it be assumed that the instant transmission illustrated in Figures 1 and 2 is applied to an automobile. Also let it be assumed that the automobile is traversing a straight stretch of roadway and is travelling in high gear or a one-to-one ratio between the input and output shafts 11 and 12, respectively. Assuming that the input shaft is rotating in a clockwise direction and the gyroscope 33 is revolving in a counter clockwise direction as viewed from the left end of Figure 2 then the output shaft would also be travelling in a clockwise direction as viewed in this direction. The above stated relative direction of revolution is necessary to desired operation for the gyroscope of the referred to altered path version, whereas the direction of revolution is of no consequence for the gyroscope of the referred to normal version. Under these conditions because there is a torque required on the output shaft then the output shaft has a tendency to travel at a slower r.p.m. in a clockwise direction than does the input shaft and carrier. As a result of this tendency the interengagement of the gears 23, 25, 38 and 39 tends to rotate the shaft 36 and gyroscope 31 in a clockwise direction as viewed in Figure 1. The mass 33 of the gyroscope is revolved in a direction which causes the force of the inertia mass to oppose this aforedescribed tendency of the gyroscope to rotate in a clockwise direction and offsets the same. Assuming that the vehicle has traversed the level stretch of roadway and is starting to negotiate a hill. Under these conditions the output torque requirement of the output shaft 12 becomes comparatively large as compared to the condition hereinabove described. Under these conditions, the tendency of the gyroscope to rotate with the shaft 36, becomes much greater than the restraining force of the gyroscope. Because of the gearing between the output shaft and the shaft 36, the gyroscope rotates in a clockwise direction as viewed in Figure 2. In acting as a transmission, the difference in r.p.m. between the input shaft and the output shaft is reflected in the rotational r.p.m. of the gyroscope and shaft 36 and bears a fixed relation thereto depending upon the gear ratio between the output shaft and the shaft 36 of the gyroscope. The increase in torque in the output shaft relative to the decrease in speed thereof is the result of the torsional contribution of the gyroscope.

Assuming a fixed gear linkage between the output shaft and the gyroscope 31 and excluding the structure of the arm 50, springs 60, 61, and 64, it will be seen that in a normal cycle of the gyroscope it traverses 360° of rotation with shaft 36. During the first 180° rotation in a clockwise direction from the position shown in Figures 1 and 2, the gear train and the action of the gyroscope act together tending to speed up or in other words to lessen the time necessary for the first 180° to be traversed. In the second 180° the action of the gearing and the action of the gyroscope are in opposition to each other and have a tendency to decrease the speed or increase the time necessary to traverse the second 180°. The first portion of the cycle represents the kinetic energy absorption period by the inertia mass from the input. Since the time required during the first portion of the cycle tends to be short, the instantaneous input torque requirement tends to be high. The second portion of the cycle represents the period in which kinetic energy of the inertia mass is being given up to the output. The time required during the second portion of the cycle tends to be comparatively long and as a result the instantaneous output torque tends to be comparatively low. It should be recognized under the conditions cited above that the tendencies of the first and second portions of the cycle of the gyroscope are reversed with regard to the effect desired since the increase in torque is required at the output and a decrease in torque is the requirement at the input notwithstanding the fact of the instantaneous high torque requirement of the input and the instantaneous low torque requirement of the output. Notwithstanding these facts, the transmission described herein does function properly as a transmission but without the additional advantages contained in the structure of Figures 1 and 2. Some of the difficulties encountered in the simplified version of the transmission are that it will lock into high gear quite strongly. The input member is also apt to vibrate unduely due to the momentary high torque shocks. Some of the capacity available in such a mechanism is wasted due to the conditions cited.

The difficulties mentioned hereinabove wherein the gearing or linkage is fixed between the shaft 36 and the output shaft 12 have been obviated by the inclusion of a mechanism which will increase the time of the first portion of the cycle and decrease the time of the second portion of the cycle. The structure which has been specifically disclosed in the instant application includes the arm 50 which is fixedly secured to the shaft 36 in combination with the abutments 55 and 56, and the springs 60, 61, and 64. With the use of this structure, the first portion of the above referred to cycle of the gyroscope is now slow as compared to the second portion of the cycle. The reason for this action will be more apparent from an observation of Figure 1 of the drawings. As a result of this slowing down in the first portion of the cycle as compared to speeding up during the second portion, the inertia forces are being more properly utilized to transmit energy from the input to the output shaft. The manual aspects of varying the capacity of the transmission have to do with the ability of an operator of the device to vary the power input to the motor 32 of the gyroscope 31. In other words, the power input to the gyroscope determines the rate at which the gyroscopic mass 33 is revolved about its axis of revolution. By increasing the speed of revolution of the gyroscopic mass 33 about its axis, the capacity of the transmission increases whereas a corresponding decrease will decrease the capacity of the transmission.

The operation of the transmission is cyclic in nature, with kinetic energy being absorbed from the input by the inertia mass during the first portion of the cycle, then being relayed to the output and/or back to the input, depending upon the degree of resistance of the output, during the second portion of the cycle. It should be kept in mind that the true input force is the Mean Effective input force, and likewise, the output force is the Mean Effective output force and that the instantaneous forces have very little relationship to the average or Mean Effective condition.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

A transmission including in combination an input shaft and an output shaft, a sun gear secured to said output shaft, a carrier secured to and driven by said input shaft, a planet gear journalled by said carrier and intermeshing with said sun gear, a gyroscope, pivot means mounting said gyroscope on said carrier to rotate on an axis generally transverse to said input shaft, gear means interconnecting said gyroscope pivot means and said planet gear whereby movements of said planet gear and said rotation of said gyroscope on said pivot means are transmitted to each other, means for independently revolving the gyroscopic mass about the axis of said gyroscope and means for changing the normal path of the axis of revolution of said gyroscope which is caused by the rotation of said carrier and the connection of said pivot means to said sun gear by said gear means, said means including a gear of said gear means mounted by said pivot means for movement relative thereto, an arm fixedly secured to said pivot means, first and second abutment means on said gear, first and second springs extending between said arm and said first and second abutment means respectively, and spring means between said arm and said carrier for restraining movement of said arm through a portion of its cycle.

References Cited in the file of this patent

UNITED STATES PATENTS

| | | |
|---|---|---|
| 1,791,386 | Sprigg | Feb. 3, 1931 |
| 1,992,457 | Anderson | Feb. 26, 1935 |
| 2,088,834 | Briggs | Aug. 3, 1937 |
| 2,390,341 | Williams | Dec. 4, 1945 |

FOREIGN PATENTS

| | | |
|---|---|---|
| 228,563 | Great Britain | Aug. 20, 1925 |
| 715,821 | France | Sept. 29, 1931 |